United States Patent [19]
Hamada et al.

[11] Patent Number: 5,359,440
[45] Date of Patent: Oct. 25, 1994

[54] IMAGE DISPLAY APPARATUS WITH MICROLENS PLATE HAVING MUTUALLY FUSED TOGETHER LENSES RESULTING IN HEXAGONAL SHAPED MICROLENSES

[75] Inventors: Hiroshi Hamada, Nara; Fumiaki Funada, Yamatokoriyama; Kenjiro Hamanaka; Kouji Tanaka, both of Tsukuba, all of Japan

[73] Assignees: Sharp Kabushiki Kaisha, Osaka; Nippon Sheet Glass Co., Ltd., Tokyo, both of Japan

[21] Appl. No.: 140,978

[22] Filed: Oct. 25, 1993

Related U.S. Application Data

[63] Continuation of Ser. No. 936,078, Aug. 28, 1992, abandoned, which is a continuation of Ser. No. 601,297, Oct. 22, 1990, abandoned.

[30] Foreign Application Priority Data

Oct. 23, 1989 [JP] Japan .................. 1-275410

[51] Int. Cl.$^5$ .................. G02F 1/1335; G02F 1/1343
[52] U.S. Cl. .................. 359/41; 359/40; 359/61
[58] Field of Search .................. 350/334, 345; 359/40, 359/41, 54, 61

[56] References Cited

U.S. PATENT DOCUMENTS

| | | | |
|---|---|---|---|
| 4,534,622 | 8/1985 | Harada et al. | 350/334 |
| 4,790,632 | 12/1988 | Miyakawa et al. | 350/334 |
| 4,836,652 | 6/1989 | Oishi et al. | 350/334 |
| 4,945,348 | 7/1990 | Ibamoto et al. | 350/330 |
| 5,052,783 | 10/1991 | Hamada | 359/40 |
| 5,150,138 | 9/1992 | Nakanishi et al. | 359/40 |
| 5,151,801 | 9/1992 | Hiroshima | 359/41 |

FOREIGN PATENT DOCUMENTS

| | | | |
|---|---|---|---|
| 57-53702 | 3/1982 | Japan . | |
| 0157215 | 9/1982 | Japan | 359/54 |
| 58-198001 | 11/1983 | Japan . | |
| 60-165621 | 8/1985 | Japan . | |
| 60-165622 | 8/1985 | Japan . | |
| 0169827 | 9/1985 | Japan | 350/334 |
| 0218626 | 11/1985 | Japan | 359/61 |
| 60-227233 | 11/1985 | Japan . | |
| 0244935 | 12/1985 | Japan | 350/334 |
| 60-262131 | 12/1985 | Japan . | |
| 61-284702 | 12/1986 | Japan . | |
| 0075513 | 4/1987 | Japan | 359/40 |
| 0089935 | 4/1987 | Japan | 359/61 |
| 0094826 | 5/1987 | Japan | 350/334 |
| 0262023 | 11/1987 | Japan | 359/49 |
| 0118125 | 5/1988 | Japan | 350/334 |
| 63-291466 | 11/1988 | Japan . | |
| 64-35416 | 2/1989 | Japan . | |
| 1-187502 | 7/1989 | Japan . | |
| 0222221 | 9/1989 | Japan | 350/334 |
| 212224 | 1/1990 | Japan . | |

OTHER PUBLICATIONS

James J. Cowan, "Holographic Honeycomb Microlens", Optical Engineering, vol. 24 No. 5, Sep./Oct. 1985, pp. 796–802.

*Primary Examiner*—Anita P. Gross

[57] ABSTRACT

An image display apparatus includes a display panel unit having a plurality of pixels, and a flat-plate microlens array of a refraction index distribution type. The microlens array is constituted by forming a plurality of microlenses for converging illuminating light onto the respective ones of the pixels, in a substrate by a diffusion process. In the diffusion process, diffusion fronts of the neighboring microlenses of the flat-plate microlens array are fused into each other so as to form one continuous curved surface within the substrate.

27 Claims, 4 Drawing Sheets

IMAGE DISPLAY APPARATUS WITH MICROLENS PLATE HAVING MUTUALLY FUSED TOGETHER LENSES RESULTING IN HEXAGONAL SHAPED MICROLENSES

This application is a continuation, of application Ser. No. 07/936,078 filed on Aug. 28, 1992, now abandoned, which is a continuation of application Ser. No. 07/601,297 filed on Oct. 22, 1990; now abandoned.

BACKGROUND OF THE INVENTION

The present invention generally relates to an image display arrangement, and more particularly, to an image display apparatus provided with a refraction factor distribution type flat-plate microlens array, which is suitable as a light condensing or converging device for brightening the display surface by focusing illuminating light for a transmission the display panel such as a liquid crystal panel, etc. having a plurality of picture elements or pixels, onto the region of the pixels.

Commonly, in the liquid crystal display panel to be used in the projection type liquid crystal display apparatus as referred to above, minimum display units called pixels or picture elements (referred to as pixels hereinafter) are regularly arranged. By applying independent driving voltages to the respective pixels so as to vary optical characteristics of the liquid crystal constituting each pixel, images and characters, etc. are displayed as desired.

For impressing independent driving voltages to the respective pixels, a simple matrix system has been known. An active matrix system in which non-linear two terminal elements such as MIM (Metal Insulator Metal) or the like, or three terminal switching elements such as thin film transistors, etc. are provided in the respective pixels.

In the active matrix system, it is required that, in order to apply the independent driving voltage to each of the pixels, elements such as the thin film transistors or MIM, etc. are provided on the respective pixels. Lines for supplying driving signals thereto are connected between the pixels. Therefore, rate occupied by the pixel region in the image surface (or numerical aperture) is reduced. Of the light projected onto the panel, light incident upon a region other than the pixel region is absorbed or reflected by the thin film transistors, signal lines, or shield masks provided depending on necessity, etc., and does not reach a screen. Accordingly, in the case where the liquid crystal panel is illuminated by the same intensity of illumination, the image face becomes darker as the numerical aperture is reduced. Such a state applies both to the cases where the liquid crystal panel is directly observed and also, where enlarged projection is effected by a projection lens.

In order to solve the problem that the image surface becomes dark due to the small numerical perture, there have conventionally been proposed, for example, in Japanese Laid-Open Publications Tokkaisho Nos. 60-165621 to 60-165624, methods for improving utilizing rate of illumination light by condensing it onto each pixel region, with a microlens array being provided at the light source side of the display panel. Particularly, Tokkosho No. 60-165621 discloses formation of a refraction index distribution region on a substrate of the display panel, and illustrates a refraction index distribution diagram having a concave lens effect in its embodiment. Meanwhile, Tokkaisho No. 60-262131 discloses a provision of microlens arrays at opposite sides of the liquid crystal panel.

FIG. 3 shows a refraction index distribution type flat-plate microlens array M which has been conventionally used as a condensing or converging device of projection light onto a liquid crystal panel as referred to above.

The known flat-plate microlens array M in FIG. 3 includes a substrate 101, and a plurality of microlenses 111 formed on the substrate 101 by an ion exchange process, which is a diffusion process, so that the neighboring microlenses may not contact each other. The sectional shape of the refraction index distribution region is formed into approximately a semi-spherical configuration. Accordingly, an advanced line 112 of an ion diffusion region called a diffusion front of the microlenses 111 is separated as shown.

The reason for separating the diffusion front 112 which is the boundary between the respective microlenses 111 as described above, is such that it has been generally considered that rotational symmetry of the refraction distribution configuration with respect to the optical axis, which is necessary to obtain a favorable lens effect, is undesirably impaired by the fusion of the diffusion front 112, thereby producing aberration component with directivity. This gives rise to deterioration in the condensing characteristic of the lens.

However, the conventional flat-plate microlens array as a condensing device referred to above has problems as describe hereinbelow.

The first problem is such that, even when the refraction index distribution of the microlenses 111 is in approximately a semi-spherical shape, rotationally symmetrical with respect to the optical axis, if the distribution thereof in the radial direction is improper, spherical aberration tends to take place. This adversely affects the condensing characteristic of the lens.

With respect to the above, the present inventors have found, through repeated experiments and investigations that, generally in the case where a flat-plate microlens array is produced by the ion exchange method, gradient of the refraction index distribution in the vicinity of the diffusion front 112 is large. Therefore, the optical axis incident upon the surrounding region of the microlenses 111 is excessively refracted, thus resulting in spherical aberration.

The second problem resides in that, since the microlenses 111 are arranged so that the neighboring ones are out of contact with each other, filling rate of the microlenses 111, i.e. ratio of the area occupied by the microlenses 111 to the total area of the microlens array substrate 101, cannot be made higher than a certain limit. By way of example, such limited filling rate may be represented by $$\pi/4 \div 78.5\%$$

when circular microlenses are arranged in a square lattice shape, and by $$\pi/2 \cdot \sqrt{3} \div 90.6\%$$

in the case where circular microlenses are densely arranged in a hexagonal lattice shape. Further, in the actual practice, since the microlens arrangement must be in agreement with the pixel arrangement of the display panel, the filling rate becomes even lower than the above. Since gaps among the microlenses are of an ion non-diffusion region and have no refracting function, light incident upon the region advances straight as it is, without contributing to the light condensing effect.

As described so far, the conventional flat-plate microlens array has problems with respect to the light condensing characteristic. Therefore, in the conventional projection type image display device employing such flat-plate microlens array, darkness in the display image surface has not been fully improved.

SUMMARY OF THE INVENTION

Accordingly, an essential object of the present invention is to provide an image display apparatus which is high in the utilizing rate of illumination light and capable of obtaining a bright image on the display surface by improving the condensing effect of the flat-plate microlens array for a transmission type display panel.

Another object of the present invention is to provide an image display apparatus of the above described type, which is simple in construction and stable in functioning at high accuracy.

In accomplishing these and other objects, according to one preferred embodiment of the present invention, there is provided an image display apparatus which includes a display panel having a plurality of pixels, and a flat-plate microlens array of a refraction index distribution type which is constituted by forming a plurality of microlenses for converging illuminating light onto the respective ones of the pixels, on a substrate by a diffusion process, wherein diffusion fronts of the neighboring microlenses of the flat-plate microlens array are fused into each other so as to form one continuous curved surface within the substrate.

It should be noted here that the configuration of the above one continuous curved surface should preferably be made so as to be suitable for the pitch of the pixels, and pixel openings of the display panel.

By forming the diffusion fronts of the neighboring microlenses to be fused into each other as referred to above, gradient of the refraction index distribution in and close to the respective microlenses becomes small. Therefore, the adverse effect due to the spheric aberration taking place due to excessive refraction around the microlenses may be advantageously reduced. Furthermore, since the non-lens region between the microlenses is eliminated, the filling rate with respect to the substrate of the microlenses shows a value close to 100%, with a consequent improvement of the condensing effect.

Moreover, it has been clarified through experiments by the present inventors that, although the rotational symmetrical nature of the refraction index distribution may be impaired to a certain extent by the partial fusing between the neighboring microlenses to each other, the condensing characteristic of the lenses is hardly adversely affected thereby as described in more detail later.

Accordingly, the illuminating light from the light source is effectively converged by the flat-plate microlens array so as to concentratedly irradiate the pixel region of the display panel. Thus, bright images may be obtained as compared with those of the conventional projection type image display apparatus.

BRIEF DESCRIPTION OF THE DRAWINGS

These and other objects and features of the present invention will become apparent from the following description taken in con junction with the preferred embodiment thereof with reference to the accompanying drawings, in which.

DETAILED DESCRIPTION OF THE INVENTION

Figure 1:
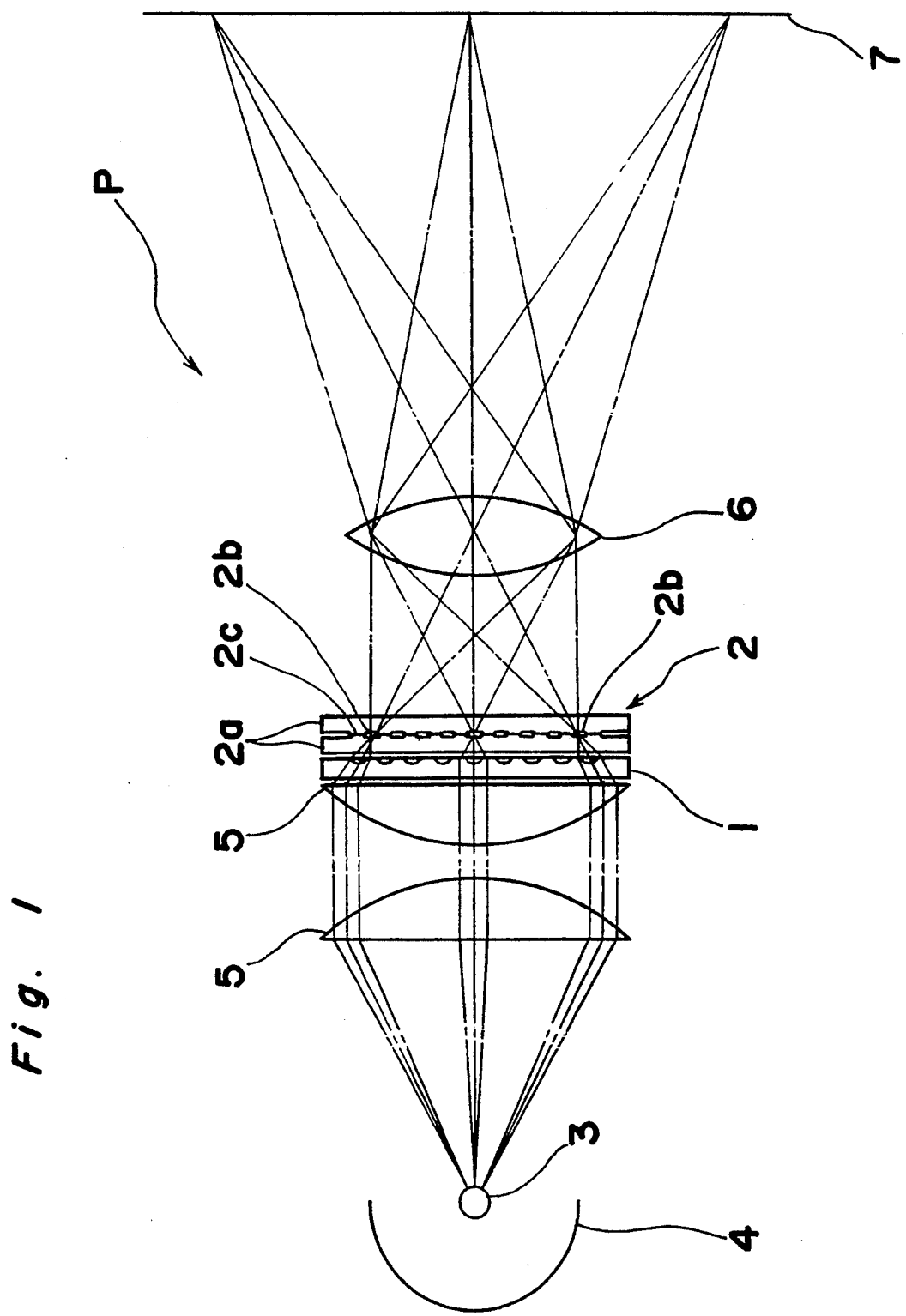
FIG. 1 is a schematic diagram showing construction of a projection type image display apparatus according to one preferred embodiment of the present invention.

Before the description of the present invention proceeds, it is to be noted that like parts are designated by like reference numerals throughout the accompanying drawings.

Figure 2:
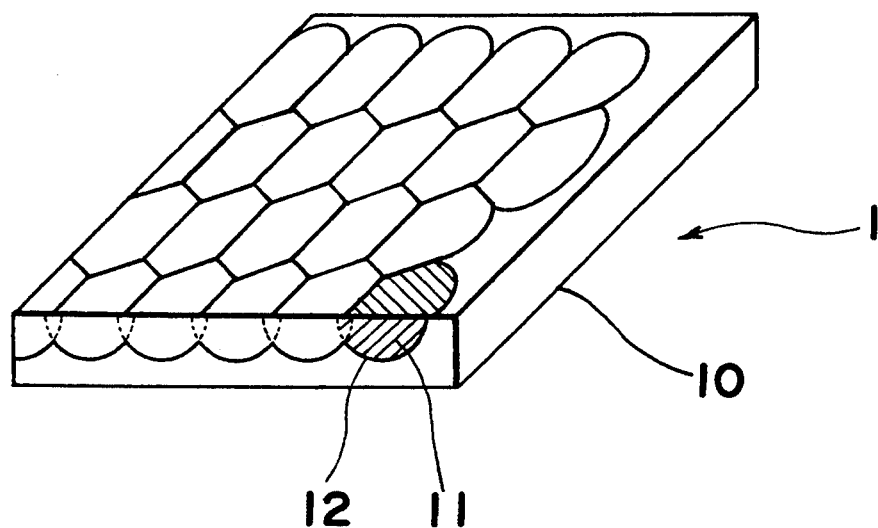
FIG. 2 is a perspective view showing on an enlarged scale, a flat-plate microlens array employed in the image display apparatus of FIG. 1.
Figure 3:
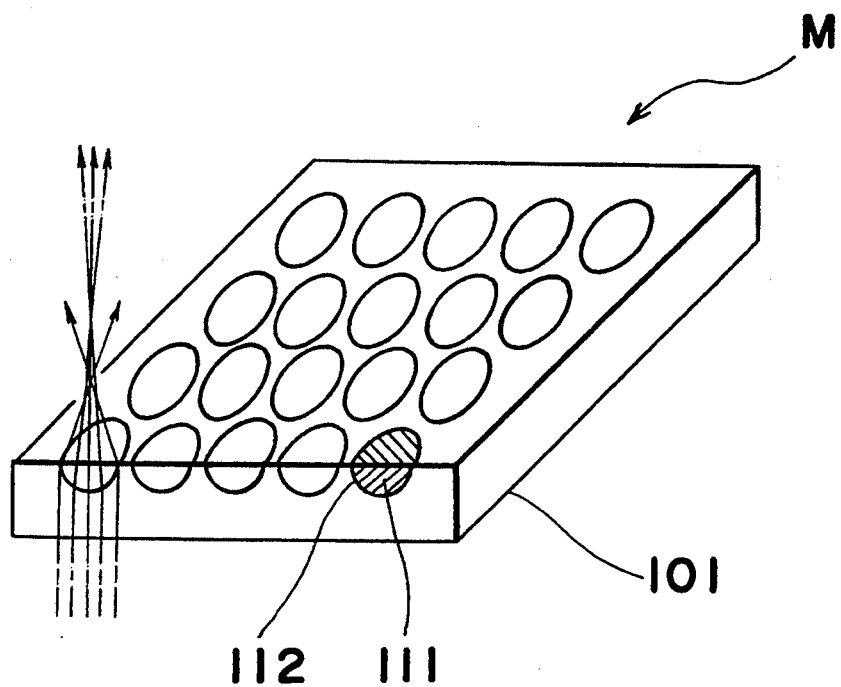
FIG. 3 is a view similar to FIG. 2, which particularly shows a conventional flat-plate microlens array.

Referring now to the drawings, there is shown in FIG. 1, a projection type image display apparatus P according to one preferred embodiment of the present invention, with a flat-plate microlens array employed therein being shown in FIG. 2.

In FIG. 1, the image display apparatus P includes a flat-plate microlens array 1 having a plurality of microlenses 11 formed on a substrate 10 (FIG. 2), a liquid crystal display panel 2 having a plurality of pixel regions 2b; a white light source 3 of a halogen lamp, metal halide lamp, xenon lamp or the like; a reflecting mirror 4 for reflecting light emitted from the light source 3 to be directed to the liquid crystal panel 2; condenser lenses 5 for converging the light from the light source 3; and a projecting lens 6 for projection of an image onto a projecting screen 7.

The image display apparatus P as described above is so arranged as to collect the light emitted from the light source 3, and direct it towards the projecting lens 6 through the reflecting mirror 4 and the condenser lenses 5 for projection onto the screen 7. Flux of light passing through the condenser lenses 5 is converged by the flat-plate microlens array 1 so as to be transmitted through the pixel region 2b of the liquid crystal display panel 2, and is modulated in the intensity according to the image signal voltage applied to the liquid crystal layer. Thereafter, it is projected onto the screen 7 by the projecting lens 6.

The above liquid crystal display panel 2 has the diagonal line of the display image surface of 75 mm, pixel pitch of 190 $\mu$m (longitudinally)×161 $\mu$m (laterally), pixel region of 88 $\mu$m (longitudinally)×104 $\mu$m (laterally), opening rate or numerical aperture of 30%, refraction index n of the substrate at 1.53, and thickness of its substrate 2a at 1.1 mm. In the present embodiment, although a twisted nematic mode is adopted for the functioning mode of the liquid crystal, it may be replaced by any other mode so far as such mode suits the purpose.

In the functioning modes of most liquid crystals, it is required to simultaneously use a polarizing plate (not shown). Although the polarizing plate may be directly stuck onto the liquid crystal display panel, such a practice should preferably be avoided, since temperature rise following light absorption by the polarizing plate adversely affects the functioning characteristic of the liquid crystal when a light source with high brightness is employed. The position for disposing the polarizing plate may be at any place, provided that nothing which may vary the polarizing characteristic is inserted with respect to the liquid crystal display panel. By way of example, the flat-plate microlens array may be inserted between the liquid crystal display panel and the polarizing plate (not shown).

Referring particularly to FIGS. 2, 4 (a) and 4 (b), the flat-plate microlens array 1 will be explained in detail hereinbelow.

In FIG. 4 (a), the pitch of the microlenses 11 in the flat-plate microlens array 1 corresponds to the pixel pitch at 190 μm (longitudinally)×161 μm (laterally) of the liquid crystal display panel 2, while the focal distance thereof is equal to the thickness of the substrate 2a for the liquid crystal display panel 2 (1.1/1.53=0.72 mm in air).

Figure 4A:
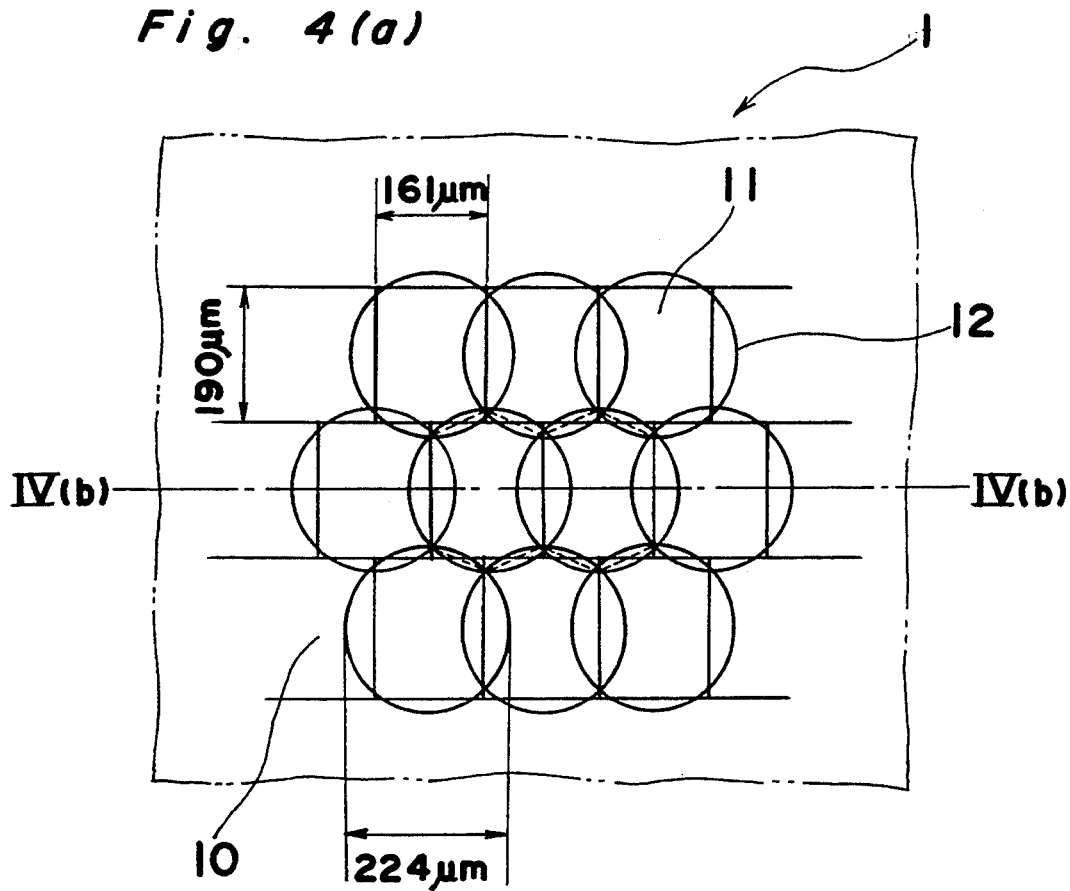
FIG. 4(a) is a fragmentary top plan view of the flat-plate microlens array of FIG. 2, showing in an enlarged scale, arrangement of the microlenses therein.

In the preferred embodiment shown in FIGS. 2 and 4a for example, the plurality of microlenses in the array are formed in rows corresponding to the picture elements of the liquid crystal panel, with each row being offset from adjacent rows by a one-half microlens pitch.

The microlenses 11 referred to above are prepared by an ion exchange process as described below.

In the first place, a metallic thin film of Al, Ti, Ni, Cr or the like is formed on the surface of the glass substrate 10 by a known thin film forming technique, such as a sputtering process, etc. Subsequently, very small opening windows, corresponding in arrangement to that of the pixels of the liquid crystal panel 2, are formed in the metallic thin film by a known lithographic technique, to thereby provide a metallic mask. This glass substrate 10 is immersed for a predetermined period of time in a solution containing ions having a higher refractive index (referred to as a second ion hereinafter) than that of ions contained in the glass substrate (referred to as a first ion). By the above processing, the ion exchange is effected through the opening windows of the metallic mask. Consequently, the approximately semi-spherical microlenses 11 of the refractive index distribution type whose refractive index is gradually lowered from the vicinity of the opening windows of the metallic mask towards the peripheral portion thereof, are to be formed.

In the above case, by properly setting the ion exchange time, etc., it is so arranged that the respective regions to which the second ionic species are diffused, i.e. diffusion fronts 12 at the advanced lines of the respective microlenses 11 are fused to each other.

When the pixel pitch of the liquid crystal display panel is at 190 μm (longitudinally)×161 μm (laterally) as in the present embodiment, the flat-plate microlens array 1 without any non-diffused region of ions over the entire surface of the glass substrate 10 may be produced by rendering the diffusion front 12 of each microlens 11 to be about 224 μm in diameter.

Figure 4B:
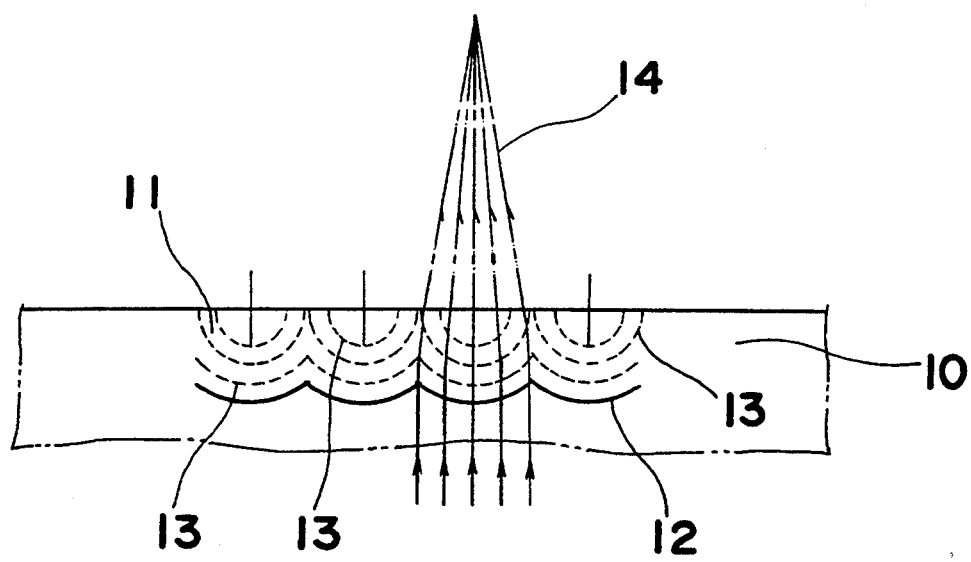
FIG. 4(b) is a cross section taken along the line IV(b)—IV(b) in FIG. 4(a), FIG. 5 (a) is a view similar to FIG. 4 (a), which particularly shows a conventional type flat-plate microlens array prepared for comparison with that of the present invention of FIG. 4 (a)

As is seen from FIG. 4(b) showing the state of refractive index and the state of converging of light at the cross section IV(b)—IV(b) of FIG. 4(a), owing to the fusion of the diffusion fronts 12 of the respective microlenses 11 to each other, the diffusion fronts 12 extending over the entire surface of the lens array 1 are formed into one continuous curved surface within the substrate 10.

As a result, in the distribution of the refractive index (equal refractive index lines are represented by the numeral 13) of the respective microlenses, the refractive index gradient becomes small in the peripheral portion of each microlens 11, and light passing through the peripheral portion of the microlens is not bent due to excessive refraction. Thus, all of the light rays 14 are focused generally into one point favorably.

It has also been found that, although the shape of the fused region for the diffusion fronts of the neighboring microlenses 11 is not rotationally symmetrical with respect to the optical axis of each microlens 11, light condensation is not adversely affected thereby excessively. Further, each microlens 11 functions to focus light rays incident upon a hexagonal region shown by a dotted line in FIG. 4(a) (The shape of the microlens 11 shown in FIG. 2 corresponds to the shape in this region) approximately into one point favorably.

The flat-plate microlens array 1 having such a superior condensing characteristic is installed in the state as shown in FIG. 1, through sticking, by arranging positions of the respective microlenses 11 to correspond to the positions of the respective pixel regions 2b of the liquid crystal display panel 2, with the use of a transparent optical bonding agent having refractive index generally equal to that of the transparent substrate of the liquid crystal display panel.

Figure 5A:
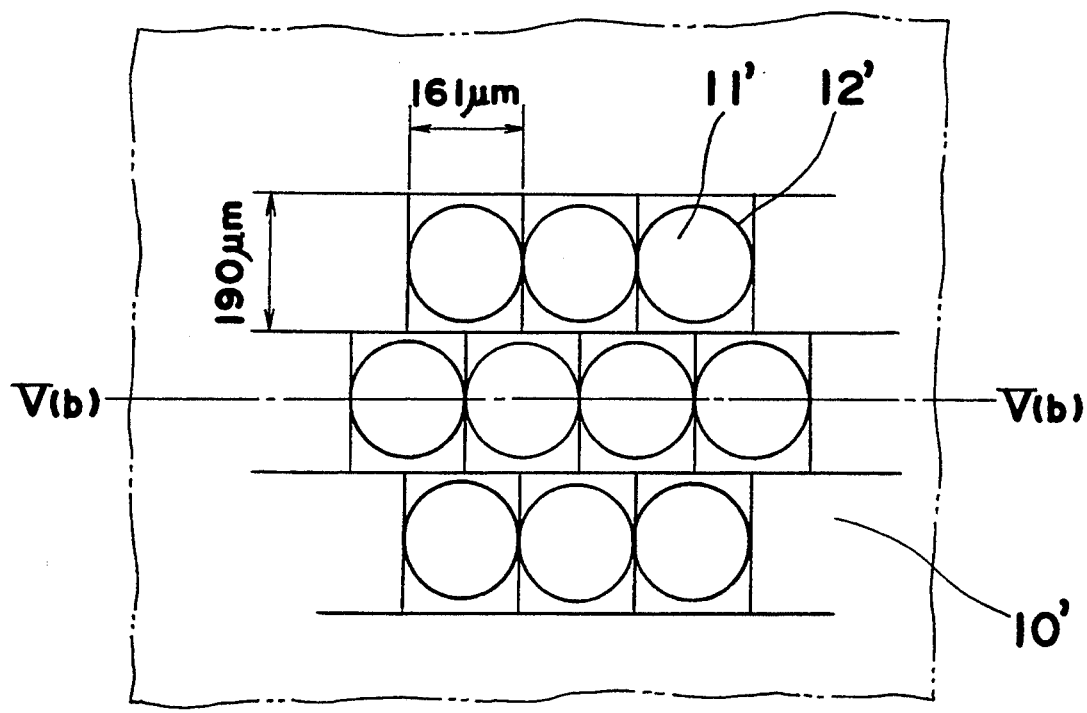
FIG. 5(b) is a cross section taken along the line V(b)—V(b) in FIG. 5(a).
Figure 5B:
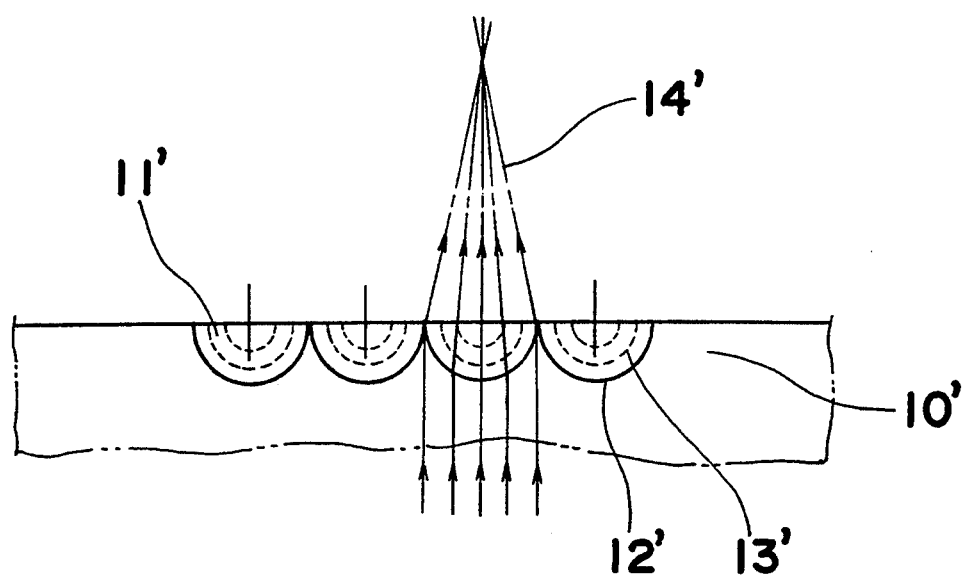

For comparison with the above flat-plate microlens array 1 to be used for the projection type image display apparatus according to the present invention, a conventional type flat-plate microlens array which has the lens diameter of 161 μm, and in which the diffusion fronts of the neighboring microlenses only contact each other without fusing, was prepared as shown in FIGS. 5 (a) and 5 (b), in which like parts in FIGS. 4 (a) and 4 (b) are designated by like reference numerals, with addition of a prime or dash thereto for brevity of explanation.

In the case of the conventional type flat-plate microlens array in which the diffusion fronts only contact each other without fusing, light rays 14' incident upon the peripheral portion of the respective microlenses 11' are excessively refracted since the refractive index gradient at the peripheral portion is too large. Further, the focal positions of the respective light rays are deviated to a large extent between the central portion of the lens and the peripheral portion thereof, thus giving rise to a large spherical aberration. The above result was similar to that of the known microlens array in which the neighboring diffusion fronts were separated without contacting.

Upon investigation into the brightness of the image to be displayed by the projection type image display apparatus of the present embodiment, it was about 2.5 times that of the arrangement in which the flat-plate microlens array 1 was not employed. Meanwhile, in the case where the flat-plate microlens array having the construction as in the conventional arrangement and prepared for comparison was used, the brightness of the display image was about 1.8 times that of the arrangement without using such microlens array.

On the other hand, in the case where a condensing or converging spot upon illumination of the flat-plate microlens array 1 by white parallel light rays was observed by a microscope, in the conventional flat-plate microlens array, halo colored due to aberration at the peripheral portion of the microlens was observed around the condensing spot when the microscope was focused to a point where the size of the condensing spot became the smallest. However, in the flat-plate microlens array 1 as used in the present invention, no halo was noticed around the condensing spot, although the shape thereof was a slightly rounded hexagonal shape.

Incidentally, according to the present invention, although the flat-plate microlens array 1 was formed so as to provide no clearance between the microlenses 11, in the case where the microlens array is prepared to provide no clearance between the microlenses as above, the areas for the region in which the diffusion fronts of the respective microlenses are fused markedly differ according to the directions. Thus, the shape of the condensing spots is disturbed to a certain extent. In such an instance, there may be a case where a better condensing effect is obtained by slightly reducing the region in which the diffusion fronts are fused through provision of small clearances between the respective microlenses. Even in the above case, the purpose of the present invention to improve condensing effect and utilizing rate of illuminating light may be achieved through reduction of the spheric aberration arising from the peripheral portion of the respective microlenses by providing the diffusion, region of the microlenses, and through increase of the area occupied by the microlenses with respect to the entire surface of the microlens array, etc.

It should be noted here that, in the foregoing embodiment, although the present invention is described with reference to the Koehler illumination, the present invention may be applied to other illumination methods, e.g. critical illumination, telecentric system, etc. as well.

It should also be noted that, although the foregoing embodiment has been described with reference to the projection type image display apparatus employing only one liquid crystal display panel, the concept of the present invention is not limited in its application, to such image display apparatus alone, but may be readily applied, for example, to a system in which three liquid crystal panels are employed so as to display images of three primary colors respectively for obtaining colored images by optically combining them. Moreover, the display panel is not limited to the liquid crystal panel, but any other display panel of transmitting type may be employed as well.

Furthermore, in the foregoing embodiment, although the flat-plate microlens array 1 is prepared by the ion exchange process, it may be produced by a monomer diffusion copolymerization process, i.e. the process including the steps of preparing a transparent substrate by half-polymerization of a first monomer, providing a molecule penetration preventing mask having many openings corresponding to the arrangement of the lenses to be formed on the surface thereof, and completing the polymerization after diffusing a second monomer into the substrate through the openings of the molecule penetration preventing mask.

Moreover, although the flat-plate microlens array is formed by the semi-spherical microlenses according to the present embodiment, such microlens array may be replaced by one formed with lenticular lenses, Fresnel lens and the like. The shape of the microlens should preferably be determined by the pixel arrangement of the display panel and the shape of the openings of pixels, etc.

As is clear from the foregoing description, according to the present invention, since the diffusion fronts of the neighboring microlenses contact each other to form one continuous curved surface, not only is the spherical aberration arising from the excessive refraction in the peripheral portions of the respective microlenses of the flat-plate microlens array in the conventional arrangements reduced, but the occupying area of the microlenses with respect to the entire substrate surface of the flat-plate microlens array may be raised close to 100%. Thus, the illumination light incident upon the display panel can be focused in the pixel region without loss for effective utilization, to thereby provide a bright projection image.

Although the present invention has been fully described by way of example with reference to the accompanying drawings, it is, to be noted here that various changes and modifications will be apparent to those skilled in the art. Therefore, unless such changes and modifications otherwise depart from the scope of the present invention, they should be construed as included therein.

What is claimed is:

1. An image display apparatus comprising:
   at least one display panel, having a plurality of pixels, for producing an image;
   a light source for outputting light; and
   a flat-plate microlens array, of a refraction index distribution type, for directing the output light from the light source through the plurality of pixels for subsequent projection of the image, the flat-plate microlens array including:
   a single substrate, and a plurality of microlenses formed in rows on the single substrate, each row being offset from adjacent rows by a one-half microlens pitch, for converging output light from the light source onto the respective ones of the pixels, each microlens overlapping a region of each adjacent microlens of said flat-plate microlens array and being mutually fused to the adjacent microlenses in the overlapping regions so as to form one continuous effective lattice of hexagonal microlenses on said substrate, with non-overlapping lens regions between adjacent microlenses being substantially eliminated, and the refraction index of the microlens array plate being reduced in the overlapping regions of the microlenses.

2. An image display apparatus as claimed in claim 1, wherein said at least one display panel is of liquid crystal.

3. An image display apparatus as claimed in claim 2, wherein said at least one liquid crystal display panel consists of a single liquid crystal display panel.

4. An image display apparatus as claimed in claim 2, wherein said at least one liquid crystal display panel includes three sheets of liquid crystal panels respectively displaying images in three primary colors which are optically combined to provide a colored image.

5. An image display apparatus as claimed in claim 1, wherein said at least one display panel is of a transmission type.

6. An image display apparatus as claimed in claim 1, wherein the microlenses before being mutually fused together are of a semi-spherical shape.

7. An image display apparatus as claimed in claim 1, wherein said flat-plate microlens array includes a plurality of lenticular lenses in which a large number of cylindrical lenses are arranged in a parallel relation at equal intervals.

8. A projection display apparatus comprising:
a display panel, including a plurality of picture elements, for producing an image;
a light source for outputting light; and
a microlens array, including a plurality of microlenses, disposed in rows on a single substrate, each row being offset from adjacent rows by a one-half microlens pitch, each microlens overlapping a region of each adjacent microlens and being mutually fused to the adjacent microlenses in the overlapping regions so as to form one continuous effective lattice of hexagonal microlenses on a face of the single substrate such that non-overlapping regions between adjacent microlenses are substantially eliminated, for directing the output light of the light source through the picture elements for subsequent projection of the image, wherein the refraction index of the microlens array is reduced in the overlapping regions of the microlenses.

9. The projection display apparatus of claim 8, wherein the microlenses of the microlens array are in a one-to-one correspondence with the picture elements of the display panel.

10. The projection display apparatus of claim 8, wherein the display panel includes a liquid crystal display element sandwiched by a pair of substrates.

11. The projection display apparatus of claim 10, wherein the focal distance of the microlens array in air is equal to a ratio of the thickness to the refraction index of the liquid crystal substrates.

12. The projection display apparatus of claim 10, wherein the liquid crystal display element is a twisted nematic liquid crystal display element.

13. The projection display apparatus of claim 8, further comprising:
a condensing means, disposed between the light source and the microlens array, for condensing the output light from the light source onto the microlens array.

14. The projection display apparatus of claim 13, wherein the condensing means includes a pair of condenser lenses.

15. The projection display apparatus of claim 8, further comprising:
a projection lens, disposed between the display panel and a display screen, for projecting the image from the display panel onto the display screen.

16. The projection display apparatus of claim 8, further comprising a reflecting mirror, disposed in proximity to the light source, for reflecting output light from the light source toward the microlens array.

17. The projection display apparatus of claim 8, wherein a pitch of the microlenses in the microlens array is nearly equal to a pitch of the picture elements of the display panel.

18. The projection display apparatus of claim 17, wherein pixel pitch of the picture elements of the display panel is approximately 190 $\mu$m longitudinally and approximately 161 $\mu$m laterally.

19. The projection display apparatus of claim 8, wherein diffusion fronts of each of the microlenses in the microlens array are approximately 224 $\mu$m in diameter.

20. The projection display apparatus of claim 8, wherein each of the microlenses is of a semi-spherical shape the microlenses before being mutually fused together.

21. The projection display apparatus of claim 8, wherein the display panel includes a single liquid crystal display panel.

22. The projection display apparatus of claim 8, wherein the display panel includes three sheets of liquid crystal panels respectively displaying images in three primary colors which are optically combined to provide a color image.

23. A microlens array, for use in a projection display apparatus, comprising:
a single substrate; and
a plurality of microlenses, disposed in rows on a face of the single substrate, each row being offset from adjacent rows by a one-half microlens pitch, each microlens overlapping a region of each adjacent microlens and being mutually fused to the adjacent microlenses in the overlapping regions so as to form one continuous effective lattice of hexagonal microlenses on the face of the single substrate such that non-overlapping lens regions between adjacent microlenses are substantially eliminated, such that light output from a light source can be directed through picture elements of the projection display apparatus for subsequent projection of an image, wherein the refraction index of the microlenses is reduced in the overlapping regions of the microlenses.

24. The microlens array of claim 23, wherein the microlenses are in a one-to-one correspondence with the picture elements of the display panel.

25. The microlens array of claim 23, wherein a display panel of the projected display apparatus includes a liquid crystal display element sandwiched by a pair of substrates and wherein the focal length of the microlens array in air is equal to the thickness divided by the refraction index of the liquid crystal substrates.

26. The microlens array of claim 23, wherein each of the microlenses is of a semi-spherical shape before being mutually fused together.

27. The microlens array of claim 23, wherein a pitch of the microlenses in the microlens array is nearly equal to a pitch of picture elements of a display panel of the projection display apparatus.

* * * * *

UNITED STATES PATENT AND TRADEMARK OFFICE
CERTIFICATE OF CORRECTION

PATENT NO. : 5,359,440

DATED : October 25, 1994

INVENTOR(S) : Hiroshi HAMADA, et al.

It is certified that error appears in the above-identified patent and that said Letters Patent is hereby corrected as shown below:

On the title page, in box (73), please change the address of the co-assignee Nippon Sheet Glass Co., Ltd. from "Tokyo" Japan to --Osaka-- Japan.

Signed and Sealed this

Fifth Day of September, 1995

Attest:

BRUCE LEHMAN

*Attesting Officer*                *Commissioner of Patents and Trademarks*